J. F. MORGAL.
PISTON RING.
APPLICATION FILED AUG. 30, 1919.
1,406,475.
Patented Feb. 14, 1922.
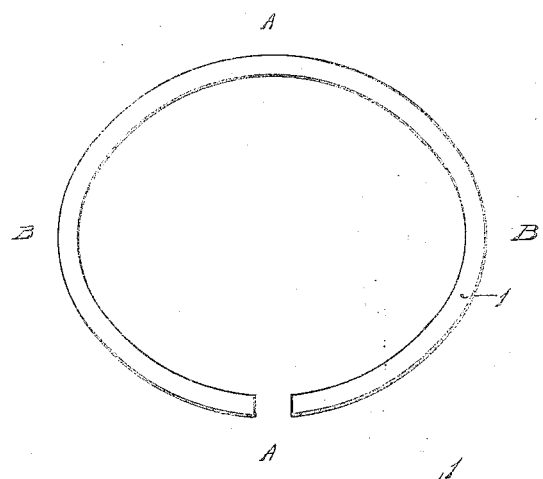
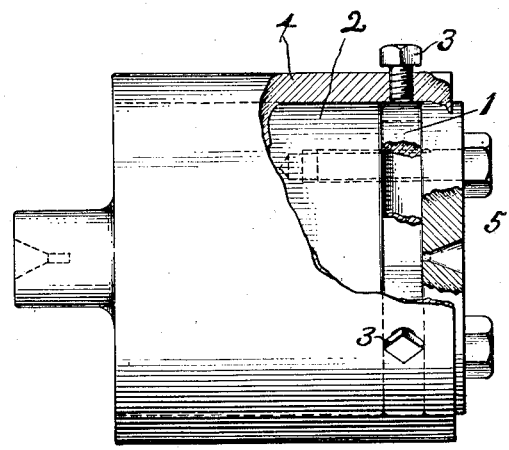
INVENTOR.
J. F. Morgal.
BY Edward Reed
ATTORNEY.

UNITED STATES PATENT OFFICE.

JOHN F. MORGAL, OF INDIANAPOLIS, INDIANA.

PISTON RING.

1,406,475.

Specification of Letters Patent.   Patented Feb. 14, 1922.

Application filed August 30, 1919.   Serial No. 320,808.

*To all whom it may concern:*

Be it known that I, JOHN F. MORGAL, a citizen of the United States, residing at Indianapolis, in the county of Marion and State of Indiana, have invented certain new and useful Improvements in Piston Rings, of which the following is a specification, reference being had therein to the accompanying drawing.

This invention relates to piston rings. As is well known to those persons familiar with the manufacture and use of piston rings, much difficulty has been experienced in producing a ring which will have contact with the cylinder wall at all points of its circumference, and which will have proper side bearing in the groove in the piston. The most common form of ring is the one piece ring having parallel inner and outer surfaces, commonly known as the one piece concentric ring. In such rings, however, the radial pressure is not uniform at all points of its circumference but increases from the point of least pressure, at that side of the ring opposite the opening, to the point of greatest pressure, at the ends of the ring adjacent to the opening and does not have contact with the cylinder wall throughout its circumference. Such a ring not only fails to form a tight joint between the piston and the cylinder throughout the circumference of the piston, but, because of the unequal pressures exerted on the wall of the cylinder, causes unequal wear of the cylinder surface, which results in the cylinder gradually acquiring a non-circular shape. It has been proposed to overcome this difficulty in the one piece ring by making the ring eccentric in form, that is, causing the ring to gradually increase in thickness from the ends thereof, adjacent to the opening, to a point opposite the opening. When such a ring is properly made, the contact is fairly good throughout its circumference, but, because of the thinness of the one side of the ring, it does not have a proper side bearing in the piston groove, and this objection very largely offsets the advantage gained by securing good contact with the cylinder wall. It has also been proposed to overcome both of these objections by making a two-part ring consisting of two concentric rings with their openings arranged opposite one another. Such a ring has fairly good contact at all points of its circumference and has satisfactory side bearing in the piston groove, but it is expensive to make and is very easily broken and, for these reasons, is objectionable.

The object of my invention is to provide a one piece ring having parallel inner and outer surfaces which will have contact with the cylinder wall at all points of its circumference; and further, to provide such a ring which can be easily manufactured and will not have any objectionable features which are not present in the standard rings now in use.

In the accompanying drawings Fig. 1 is a plan view of a piston ring embodying my invention; Fig. 2 is a front elevation of such a ring; and Fig. 3 is a plan view of the ring showing it clamped to a mandrel for finishing.

In carrying out my invention, to produce a one piece parallel ring, I so shape the ring that it will be closed by the simultaneous application of equal pressures along the major and minor diameters thereof.

Preferably, the ring is formed, by casting or otherwise, elliptical in shape, as shown at 1, with its shorter diameter A extending through the opening therein, and its longer diameter B extending parallel with that opening, and intersecting the shorter diameter at right angles, the two diameters being of such relative lengths that the closing pressure along one diameter will be the same as that along the other. Such a construction gives me absolute control of the radial pressures at four points of the ring, that is, the four points where the two diameters intersect the ring and, by varying the relative length of the diameters, or otherwise altering the shape of the ring, I can modify the pressures at these points. The radial pressures at the four points being uniform, the radial pressures of those portions of the ring lying between said four points, or between the diameters A—B, will correspond very closely, if not exactly, to the radial pressures at the said four points. Any variation of this pressure at these intermediate points can be corrected in the finishing of the ring. The ring is preferably finished by mounting it about a mandrel 2, as shown in Fig. 3, which mandrel has its outer surface cut away along said intermediate portions of the ring, and the ring may be drawn about the mandrel into true circular form by means of set screws 3 carried by a sleeve 4. The ring is then clamped in this position by means of an end plate 5, and the sleeve removed to permit the ring to be ground.

While the ring may be formed in any suitable manner, I prefer to form it by casting in the usual manner and, when the initial ring or pattern has been finished to secure proper pressures at all points of its circumference, I find that the rings cast from this pattern will likewise have proper pressures at all points of their circumference, and that very little correction is required in the finishing of the ring. Consequently, the ring can be made in the usual manner and with very little or no departure from the usual methods. The ring, when completed, will be non-circular, and preferably elliptical in shape, and will assume a circular form only when it has been sprung into the cylinder and, when it has been sprung into the cylinder, it will bear against the same at all points of its circumference. The ring being of uniform thickness that is, having its inner and outer surfaces substantially parallel throughout its circumference, will have adequate side bearing in the piston groove and this feature, combined with the wall contact at all points of the circumference of the ring, renders the ring highly satisfactory in service and effectually prevents all leakage of gas, or lubricant, past the piston.

While I have shown and described one embodiment of my invention, I wish it to be understood that I do not desire to be limited to the exact shape or construction shown, as various modifications may occur to a person skilled in the art.

Having thus fully described my invention, what I claim as new and desire to secure by Letters Patent is:

1. A one piece piston ring elliptical in form, having a portion of one side thereof removed at its minor axis and finished to give it a true circular form when closed.

2. The method of manufacturing a piston ring consisting in producing a one piece ring elliptical in form and removing a portion of said ring at its minor axis, closing said ring to substantially circular form and finishing the same while closed to give it a true circular form.

In testimony whereof, I affix my signature hereto.

JOHN F. MORGAL.